(12) United States Patent
Paiss

(10) Patent No.: US 7,010,731 B2
(45) Date of Patent: Mar. 7, 2006

(54) METHOD AND APPARATUS OF GENERATING A QUALITY INDICATOR

(75) Inventor: Omry Paiss, Herzliya (IL)

(73) Assignee: Intel Corporation, Santa Clara, CA (US)

(*) Notice: Subject to any disclaimer, the term of this patent is extended or adjusted under 35 U.S.C. 154(b) by 482 days.

(21) Appl. No.: 10/218,117

(22) Filed: Aug. 14, 2002

(65) Prior Publication Data

US 2004/0034821 A1 Feb. 19, 2004

(51) Int. Cl.
*G06F 11/00* (2006.01)
(52) U.S. Cl. .................. 714/704; 714/776; 370/332
(58) Field of Classification Search ............ 714/704, 714/746, 776; 375/224, 228, 240.27, 240.12; 370/333, 342, 242; 455/115.11, 67.13
See application file for complete search history.

(56) References Cited

U.S. PATENT DOCUMENTS 5,406,562 A * 4/1995 Roney, IV ............... 714/704
5,841,667 A * 11/1998 Martin .................... 702/182
5,936,972 A    8/1999 Meidan et al.
6,084,904 A * 7/2000 Wang et al. .............. 375/130
6,782,497 B1 * 8/2004 Yue ........................ 714/704
6,879,577 B1 * 4/2005 Lee ........................ 370/342
6,912,584 B1 * 6/2005 Wang et al. .............. 709/231

FOREIGN PATENT DOCUMENTS

| EP | 0748057 A1 | 12/1996 |
| EP | 1067730 A1 | 1/2001 |
| WO | WO 01/97385 A2 | 12/2001 |

OTHER PUBLICATIONS

PCT Search Report for PCT/US 03/19875, Dated Dec. 2, 2003.

* cited by examiner

*Primary Examiner*—Phung My Chung
(74) *Attorney, Agent, or Firm*—Pearl Cohen Zedek Latzer LLP

(57) ABSTRACT

Briefly, a method and apparatus to generate a quality indicator by measuring an error in coded mode bits of a received frame is provided. The quality indicator may be indicative of modes of a codec.

34 Claims, 2 Drawing Sheets

METHOD AND APPARATUS OF GENERATING A QUALITY INDICATOR

BACKGROUND OF THE INVENTION

Digital communication equipment may include receivers and transmitters to transmit and receive data packets. The data packets may include frames of multimedia information. For example, the frames may include information of audio, video and the like. Codecs, for example, speech codecs and/or video codecs may receive frames that may include errors. The codecs may code/decode the multimedia frames according to a quality of a transmit/receive channel, respectively. In some codecs, a rate and/or a mode of coding/decoding may be adjusted according to the quality of the channel. The adjustment may be used to perform more accurate coding/decoding of the multimedia frames. Unfortunately, the adjustment of the rate and/or mode may not prevent the codecs from generating unreliable coded/decoded multimedia frames.

Thus, there is a need to provide improved ways of adjusting coding/decoding rates and/or modes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
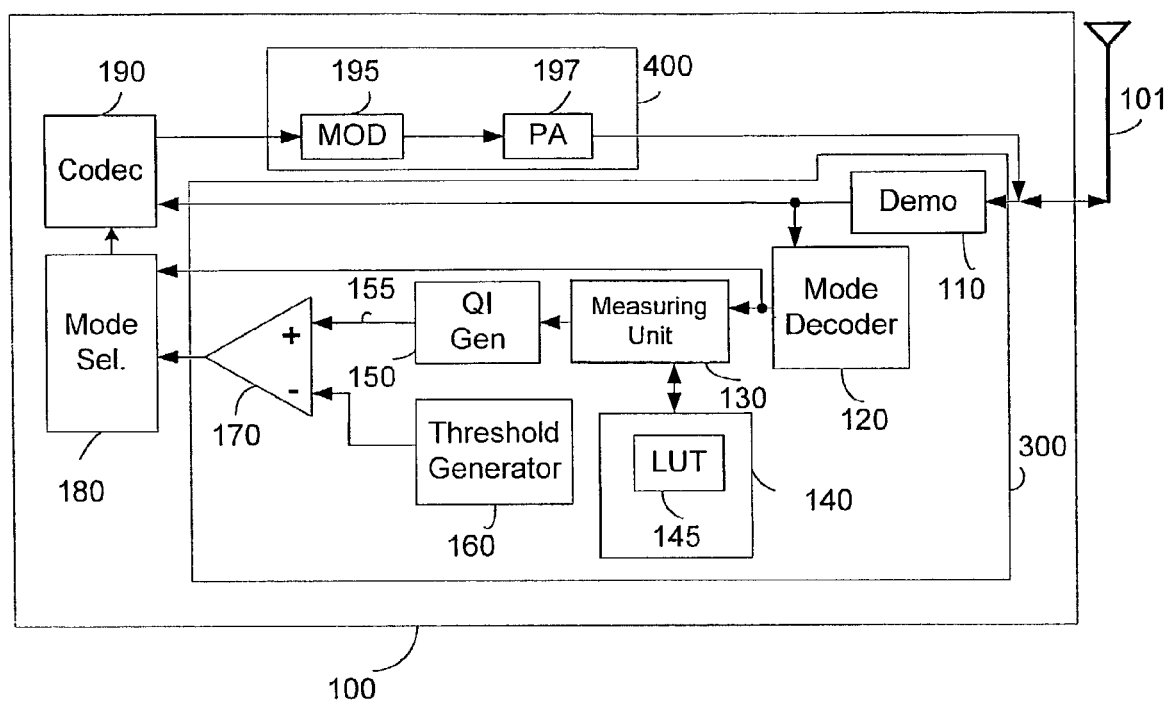
FIG. 1 is a block diagram of a transceiver, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Furthermore, the use of the term "plurality" throughout the specification, refers to "two or more" for example, "plurality of combinations" refer to two, three, four or more combinations. In another example, "plurality of error measurements" refers to two, three, four or more error measurements.

It should be understood that the present invention may be used in variety of applications. Although the present invention is not limited in this respect, the circuits and techniques disclosed herein may be used in many apparatuses such as codecs. Codecs intended to be included within the scope of the present invention may include, by way of example only, an Adaptive Multi Rate (AMR) voice codec as used in GSM and UMTS cellular standards, a multi mode video codec, and the like. It should be understood by one skilled in the art that the term "mode" throughout the specification may refer to the codecs mode of operation. For example, the codecs mode of operation may be a rate of coding/decoding, an algorithm of coding/decoding, a bit allocation of coding/decoding and the like.

Turning to FIG. 1, a transceiver 100 in accordance with an embodiment of the invention is shown. The transceiver 100 may comprise a receiver 300, a transmitter 400, a mode selector 180, a media coder/decoder (i.e., codec) 190 and an antenna 101. Receiver 300 may include a demodulator 110, a mode-decoder 120, a measuring unit 130, a memory 140 that may include a look up table (LUT) 145, a quality indicator generator (QIG) 150, a threshold generator 160 and a comparator 170. Transmitter 400 may include a modulator 195 and power amplifier (PA) 197.

Although the scope of the present invention is not limited to these examples, transceiver 100 may include a cell phone handset, a wireless handheld device, a wireless personal data assistance (PDA), a digital transceiver, and the like. Although the scope of the present invention is not limited in this respect, the description below will refer, by way of example only, to a transceiver of a universal mobile telecommunication system (UMTS) that may operate in a global system for mobile (GSM) cellular communication network and/or in a wideband code division multiple access (WCDMA) cellular network, and the like.

In operation, antenna 101 may receive modulated radio frequency (RF) signals, which may include data frames. For example, a data frame of GSM may include 448 coded bits of voice and 8 coded bits of mode bits. Receiver 300 may receive the RF signal and demodulator 110 may demodulate the RF signal and may provide, for example, coded media bits such as, for example, voice, speech, audio and video to media codec 190, if desired. Although the scope of the present invention is not limited in this respect, the mode bits may be used to vary the decoding/coding mode of media codec 190 in accordance with the transmit/receive channel quality. For example, a portion of a standard "3GPP TS 05.09 V8.5.0 (2001-11); Technical Specification; 3rd Generation Partnership Project; Technical Specification Group GSM/EDGE; Radio Access Network; Link Adaptation; (Release 1999)" signal, which refers to AMR voice codec, may define four "legal" combinations of the coded mode bits: "00000000"; "10111010", "01011101" and "11100111", wherein the first combination may be used to set media codec 190 to its lowest rate and the last combination may be used to set media codec 190 to its highest rate. Although the scope of the present invention is not limited in this respect, media codec 190 may be an audio codec, such as, for example, an AMR codec, and the like.

Although the scope of the present invention is not limited in this respect, mode-decoder 120 may receive the data frame and decode the coded mode bits. In addition, mode decoder 120 may provide mode bits to mode selector 180 and coded mode bits to measuring unit 130. For example, in some embodiments of the present invention, mode selector 180 may vary the mode of media codec 190 according to the mode bits. However, in other embodiments of the present invention, media codec 190 may receive the mode bits from mode decoder 120. Thus, media codec 190 may vary the decoding/coding mode according to the mode bits.

Furthermore, measuring unit 130 may receive, for example, four valid combinations of coded mode bits from LUT 145 and a combination of coded mode bits from mode decoder 120. Measuring unit 130 may measure an error between the valid combinations to the received combination of coded mode bits, and may store the measurement in memory 140, if desired. Although the scope of the present invention is not limited in this respect, memory 140 may be a Flash memory, a read access memory (RAM), a dynamic RAM (DRAM), an erasable/programmable read only memory (ROM) and the like. However, it should be understood by one skilled in the art that, in some embodiments of the present invention, LUT 145 may be included in memory 140 and, in other embodiments of the present invention, LUT 145 may be a stand-alone unit, if desired.

Although the scope of the present invention is not limited in this respect, QIG 150 may receive the error measurements from measuring unit 130 and may generate a quality indicator 155. The error measurement that may be used by QIG 150 to generate quality indictor 155 may be an error measurement having a reduced error compared to the error measurements. For example, the reduced error may be a minimal error, if desired. Furthermore, QIG 150 may manipulate the selected error measurement with a quality parameter to generate quality indicator 155.

Although the scope of the present invention is not limited in this respect, in some embodiments of the present invention quality indicator 155 may be used to select the mode of codec 190. For example, comparator 170 may compare quality indicator 155 to a threshold that may be generated by threshold generator 160 and provide a signal to mode selector 180. Furthermore, the signal to mode selector 180 may be at one of two levels, namely, a high level ("1") or low level ("0"). For example, if the signal is high (e.g., logic value "1") mode selector 180 may refer to the mode bits as reliable mode bits and may vary the mode of codec 190 accordingly. However, if the signal is low (e.g., logic value "0"), mode selector 180 may refer to the mode bits as unreliable and set the mode to a predetermined (e.g., default) mode, if desired.

Furthermore, in embodiments of the present invention quality indicator 155 may be used in the decoding operation of media codec 190, for example, to conceal errors in voice information of the received data frame, if desired.

For example, codec 190 in some embodiments of the present invention may be a voice decoder. In this example, the voice decoder may receive a label from demodulator 110. The label may indicate whether the received data frame is reliable. If the received data frame is not reliable, an error concealment process may be executed. The error concealment process may extrapolate and gradually mute the voice of the decoded data frame. However, at least some unreliable data frames may be labeled as reliable frames by demodulator 110, thus causing significant artifacts in the decoded voice signal. Although the present invention is not limited in this respect, quality indicator 155 may be used to filter out mislead labels by accepting a label indicating a reliable frame only if quality indicator 155 is at a high level.

Although the scope of the present invention is not limited in this respect, media codec 190 may encode media information. For example, media codec 190 may encode speech bits of a UMTS cell phone device at a predetermined mode and may provide a data frame that may include coded speech bits and coded mode bits. Furthermore, in some embodiments of the present invention, the mode bits may be set with the quality indicator. Furthermore, modulator 195 may modulate the frame and provide a modulated RF signal to PA 197, which may transmit the modulated RF signal using antenna 101.

Figure 2:
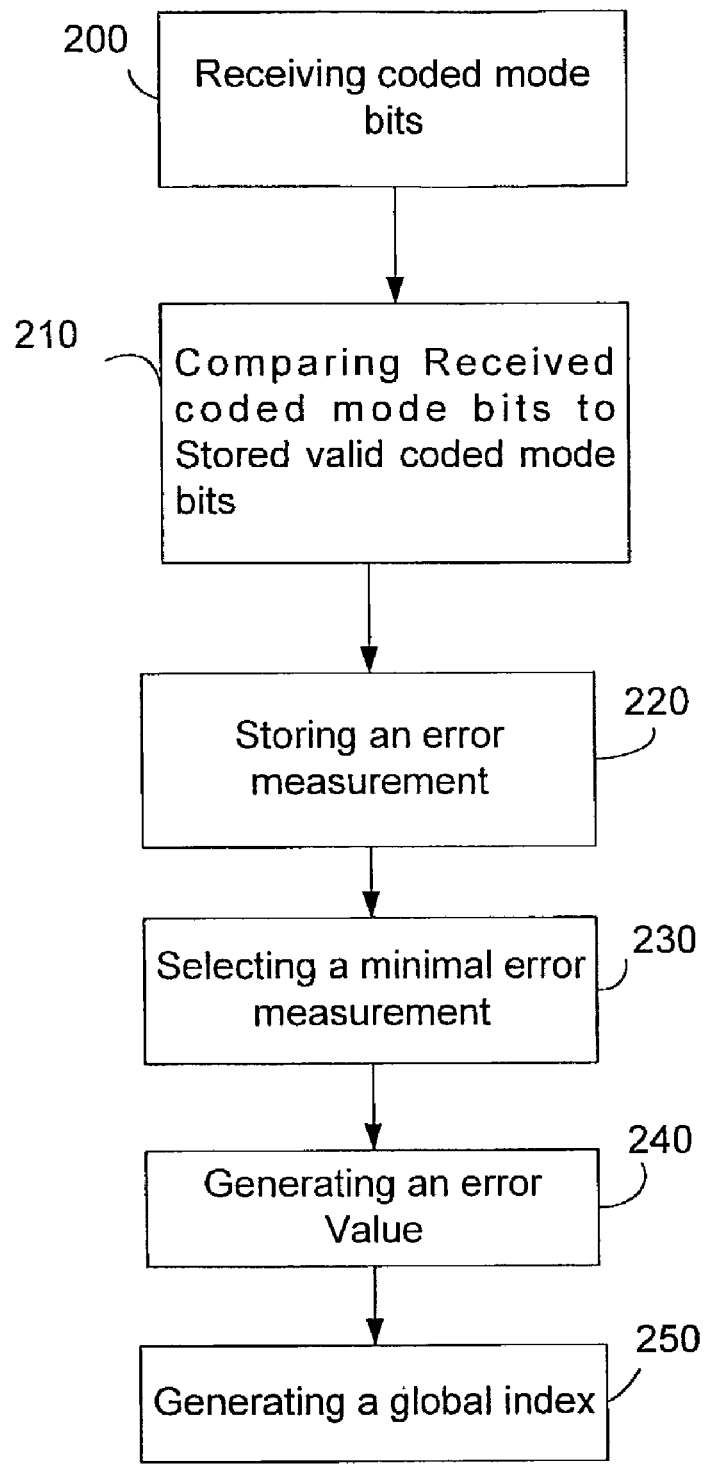
FIG. 2 is flow chart of a method according to embodiments of the present invention.

Turning to FIG. 2 a method of generating a quality indicator according to one embodiment of the present invention is shown. The method may start with receiving a data frame that may include media bits and coded mode bits that may indicate the modes of media codec 190 (block 200). The received coded mode bits may be compared to a plurality of different valid combinations of coded mode bits, to provide an error measurement (block 210), if desired. It will be understood to the one skilled in the art that, although the scope of the invention is not limited in this respect, the number of possible combinations of the coded mode bits may depend on the codec type and the communication network standard.

For example, in UMTS cellular networks, the standard requirements include using an AMR codec that may include four modes, which may be encoded into eight bits, if desired. Thus, the number of combinations in this example is 256, while only four of them may be valid combinations. Furthermore, the operation of block 210 may be provided to all of the combinations. More particularly, the comparison may be performed using a bit-wise XOR operation, and the result of the XOR operation may be inputted to a counter. The counter may count the "1's" output from the XOR operation. Thus, the output of the counter may indicate an error value. Furthermore, the error value may be stored in memory 140 (block 220).

In addition, it should be understood by one skilled in the art that the counter output may be defined in terms of Hamming distance and, accordingly, the operation described with reference to block 210 may include measurements of the Hamming distance between the received coded mode bits and a valid combination of coded mode bits.

Although the scope of the present invention is not limited in this respect, an error measurement with a minimal Hamming distance of the stored error measurements may be selected (block 230). However, in alternative embodiments of the present invention, the selection may be performed by sequentially comparing the received coded mode bits with the stored valid combinations of coded mode bits, and receiving one error measurement at a time, if desired. The error measurement may be compared with a previously stored error measurement. If, for example, a current error measurement is smaller than a previously stored error measurement, then the current error measurement may be stored instead of the previously stored error measurement. Furthermore, the stored error measurement may be manipulated with at least one quality parameter, and may be set as an error value (block 240). The error value may be set as a quality indicator (block 250). However, in other embodiments of the present invention, the error value may be set as the quality indicator 155.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
   generating a quality indicator by measuring an error in coded mode bits of a received frame, wherein the coded mode bits are indicative of modes of a codec;
   decoding the received frame to provide a labeled received frame; and
   determining a reliability of the received frame based on the quality indicator and a reliability label of the labeled received frame.

2. The method of claim 1, wherein measuring the error comprises:
   providing a plurality of error measurements by comparing between the coded mode bits of the received frame and a plurality of valid combinations of coded mode bits;
   selecting an error measurement from the plurality of error measurements; and
   generating an error value by manipulating the selected error measurement with a quality parameter.

3. The method of claim 2, wherein generating the quality indicator comprises:
   setting the error value as the quality indicator.

4. The method of claim 2, wherein determining the plurality of error measurements comprises:
   measuring a Hamming distance between the coded mode bits of the received frame and the plurality of valid combinations of coded mode bits.

5. The method of claim 2, wherein generating the error value comprises
   setting a Hamming distance as the error value.

6. The method of claim 1, further comprising:
   selecting a mode of the codec according to the quality indicator.

7. The method of claim 1, further comprising:
   concealing errors in voice information of the received frame based on the quality indicator.

8. An apparatus comprising:
   a measuring unit to provide a measurement of an error in coded mode bits of a received frame, wherein the coded mode bits are indicative of modes of a codec that is able to decode coded media bits of the received frame;
   a quality indicator generator to generate a quality indicator according to the error in the coded mode bits, wherein the quality indicator is indicative of the reliability of the received frame; and
   a mode selection unit to select a mode of the codec according to the coded mode bits and the quality indicator.

9. The apparatus of claim 8, further comprising:
   a demodulator to demodulate a received signal to provide the received frame, wherein the received frame comprises the coded mode bits and coded media bits; and
   a mode-decoder to decode the coded mode bits to provide decoded mode bits.

10. The apparatus of claim 9, wherein the demodulator comprises a Global System for Mobile communication (GSM) decoder.

11. The apparatus of claim 9, wherein the demodulator comprises a universal Mobile telecommunication system (UTMS) decoder.

12. The apparatus of claim 8, further comprising:
    a look up table to provide a plurality of valid combinations of coded mode bits to the measuring unit,
    wherein the measuring unit is able to measure the error by comparing between the received coded mode bits and the valid combinations of coded mode bits.

13. The apparatus of claim 12, wherein the quality indicator generator is able to generate the quality indicator by selecting a measurement with a reduced error from a plurality of measurements provided by the measuring unit.

14. The apparatus of claim 8, further comprising:
    a look up table to provide a plurality of valid combinations of coded mode bits to the measuring unit, wherein the measuring unit is able to measure a Hamming distance between the received mode bits and at least one of the plurality of valid combinations of coded mode bits.

15. The apparatus of claim 14, wherein the quality indicator generator is able to generate the quality indicator by selecting a reduced Hamming distance from the Hamming distances measured by the measuring unit.

16. The apparatus of claim 8 wherein the mode selection unit is able to vary an encoding/decoding mode of the codec if the quality indicator is below a threshold.

17. The apparatus of claim 8 wherein the codec is able to decode encoded voice bits according to the quality indicator.

18. The apparatus of claim 8 wherein the codec comprises an adaptive multi rate voice codec.

19. An apparatus comprising:
    a quality indicator generator to generate a quality indicator according to an error in coded mode bits of a received frame;
    a comparator to determine whether the received frame is reliable according to the quality indicator and a threshold; and
    a mode selection unit to select a mode of an Adaptive Multi Rate (AMR) voice codec according to the mode bits of the received frame if the comparator determines the received frame is reliable.

20. The apparatus of claim 19, further comprising:
    a demodulator to demodulate a received signal to provide the received frame, wherein the received frame comprises the coded mode bits and coded media bits; and
    a mode decoder to decode the coded mode bits and to provide mode bits.

21. The apparatus of claim 20 wherein the demodulator comprises a Global System for Mobile communication (GSM) decoder.

22. The apparatus of claim 20 wherein the demodulator comprises a universal Mobile telecommunication system (UTMS) decoder.

23. The apparatus of claim 19, comprising:
    a measuring unit to measure the error in the coded mode bits by comparing between received coded mode bits and the plurality of valid combinations of coded mode bits.

24. The apparatus of claim 23, wherein the quality indicator generator is able to generate the quality indicator by selecting an error measurement with a reduced error from a plurality of error measurements provided by the measuring unit.

25. The apparatus of claim 23, wherein the measuring unit is able to measure a Hamming distance between the coded bits of the received frame and each of the plurality valid combinations of coded mode bits.

26. The apparatus of claim 25, wherein the quality indicator generator is able to generate the quality indicator by selecting a reduced Hamming distance from the Hamming distances measured by the measuring unit.

27. The apparatus of claim 19 wherein the mode selection unit is able to vary an encoding/decoding mode of the Adaptive Multi Rate voice codec if the quality indicator is below the threshold.

28. The apparatus of claim 27 wherein the Adaptive Multi Rate voice codec is able to decode encoded voice bits according to the quality indicator.

29. An article comprising a storage medium having stored thereon instructions that, when executed by a computing platform, result in:
   generating a quality indicator by measuring an error in coded mode bits of a received frame, wherein the coded mode bits are indicative of modes of a codec;
   decoding the received frame to provide a labeled received frame; and
   determining a reliability of the received frame based on the quality indicator and a reliability label of the labeled received frame.

30. The article of claim 29, wherein the instructions further result in:
   comparing between the coded mode bits of the received frame and a plurality of valid combinations of coded mode bits to provide a plurality of error measurements;
   selecting one of the plurality of error measurements; and
   generating an error value by manipulating the selected error measurement with a quality parameter.

31. The article of claim 30, wherein the instructions of generating the quality indicator further result in:
   setting the error value as the quality indicator.

32. The article of claim 30, wherein the instructions of comparing between the coded mode bits result in measuring a Hamming distance between the coded mode bits of the received frame and the plurality of valid combinations of coded mode bits, and wherein the instructions of generating the error value comprises setting the Hamming distance as the error value.

33. The article of claim 29, wherein the instructions further result in:
   selecting a mode of the codec according to the quality indicator.

34. The article of claim 33, wherein the instructions further result in:
   concealing errors in voice information of the received frame according to the quality indicator.

* * * * *